July 5, 1927.
C. F. TAYLOR
FLEXIBLE COUPLING
Filed Aug. 7, 1923
1,634,965
2 Sheets-Sheet 1
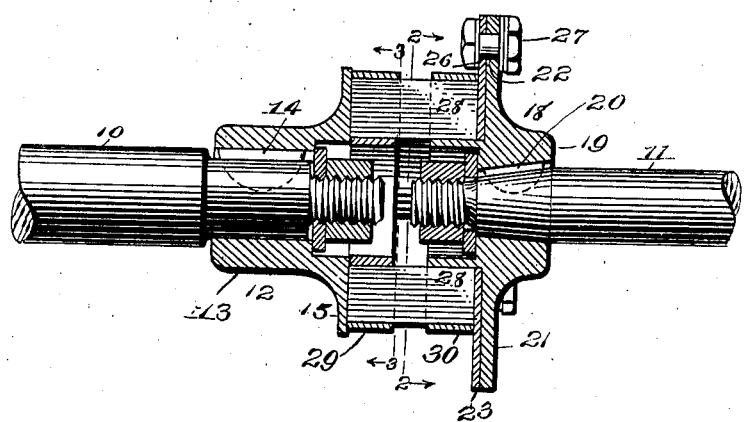
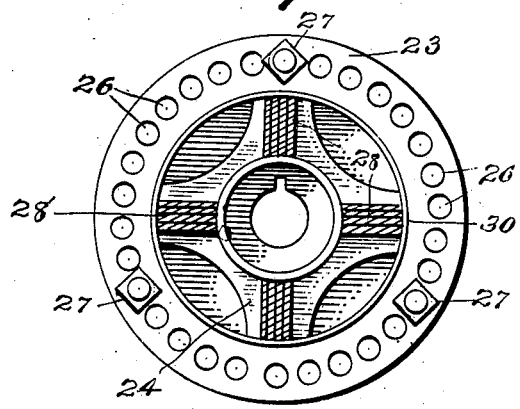
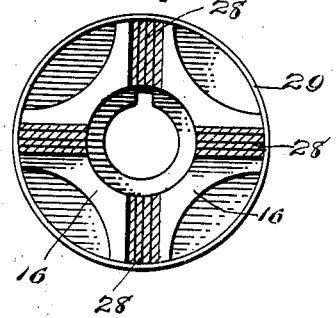
Inventor
Charles F. Taylor
By Robert H. Young, Attorney

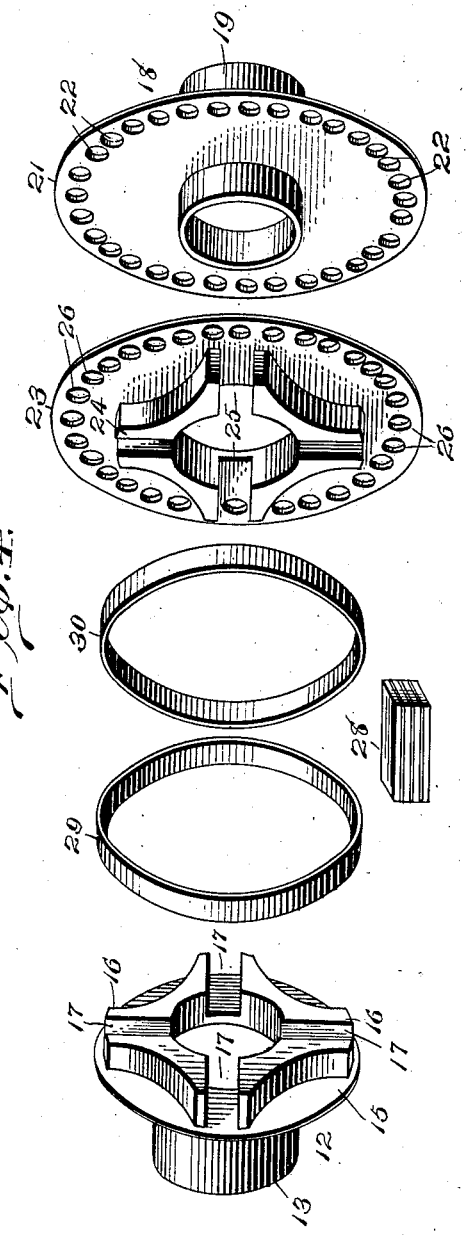

Patented July 5, 1927.

UNITED STATES PATENT OFFICE

CHARLES F. TAYLOR, OF MONTCLAIR, NEW JERSEY.

FLEXIBLE COUPLING.

Application filed August 7, 1923. Serial No. 656,195.

This invention relates to flexible couplings and more particularly to that class of couplings adapted for use in driving magnetos of internal combustion engines.

The object of this invention resides in the provision of an improved coupling of the type above set forth in which members are fixedly carried by the driving and driven shafts and are adjustably and flexibly connected to allow for the fine adjustment of the members rotatively relatively to each other and to also absorb any undue shock incident to the rotation of the driving shaft before the same is imparted to the driven shaft.

Another object of this invention is to provide a flexible coupling so compact in its construction and assembly that it will require no increase of distance between the drive shaft and the magneto shaft when used in this connection.

With these and other objects in view this invention consists of certain combinations and arrangements of parts as will be hereinafter fully described and claimed.

In the drawing wherein like characters designate like parts in the several views, Fig. 1 is a longitudinal section of my improved device.

Fig. 2 is a section taken on line 2—2 Fig. 1.

Fig. 3 is a section taken on line 3—3 Fig. 1.

Fig. 4 is a perspective view of the parts of the coupling disassembled.

Referring to the drawings by reference numerals 10 designates a driving shaft and 11 a driven shaft. The coupling connecting the shafts includes a member 12 comprising a collar 13 retained on the shaft 10 by means of the key 14, and a flange 15 provided with a plurality of projections 16 on one face forming equally spaced rectangular recesses 17. On the driven shaft 11 the member 18 is secured. This member includes a hub 19 which is secured on the shaft 11 by the key 20, and a flange 21 provided with a series of openings 22. A plate 23 is provided, the same being mounted on the member 18 and has formed on one face thereof projections 24 providing equally spaced rectangular recesses 25 of the same dimensions as the recesses 17 in the member 12 and located at a corresponding distance from the axis of rotation of the shafts 10 and 11. A series of openings 26 are formed in the plate 23 some of the same adapted to be aligned with certain of the openings 22 in the member 18 to allow for the placement of a detachable securing means 27 to retain the member 23 in rigid connection with the plate 18. The number of openings in the member 18 and the plate 23 are not the same, to allow for the minute rotation adjustment of these members 18 and the plate 23 relatively, thereby providing a means for the adjustment of the relative positions of the driving shaft 10 and driven shaft 11. This is of special value when the coupling is used in connection with a magneto shaft in order to bring the magneto into proper timing relation with the driving shaft.

Resilient plugs 28 are positioned in the registering recesses 17 and 25 and thus the driving member 12 and the plate 23 are connected. Bands 29 and 30 are mounted respectively on the projections 16 and 24 to retain the plugs 28 in the recesses 17 and 25.

When the coupling is assembled as described the motion of the driving shaft 10 is transmitted to the member 12 thence to the plate 23 by means of the plugs 28 and to the member 22, because of the rigid connection between the plate and this member and obviously the driven shaft 11 is rotated with the member 18. The flexibility of the plugs allows of considerable misalignment between the driving and driven shafts 10 and 11 and also provides a shock absorbing means very desirable when the device is used in connection with magnetos and other delicate mechanisms. The degree of flexibility of the coupling may be varied by changing the distance between the members 12 and 23 and also the length and material of the plugs.

I claim:

In combination, in a means for coupling two shaft members, a pair of disk-like coupling members having hub portions provided with a plurality of recesses formed therein, flexible coupling means mounted in said recesses and forming the sole coupling means between said disk like members, and a loosely mounted metallic band concentrically surrounding said flexible coupling means to limit motion thereof radially with respect to said shaft, one of said disk-like coupling members having a plurality of apertures disposed adjacent its periphery, a disk like member secured to one of said shaft members and similarly provided with a series of apertures for engaging with the apertured disk of said coupling member, said apertured disk members having an unequal number of apertures to provide a vernier adjustment of the initial stress on said flexible members, means for securing said disk like members in adjusted position, and means for securing the other of said coupling members to the other of said shaft members.

In testimony whereof I affix my signature.

CHARLES F. TAYLOR.